United States Patent
Maeng et al.

(10) Patent No.: US 9,832,271 B2
(45) Date of Patent: Nov. 28, 2017

(54) METHOD AND APPARATUS FOR CONNECTION BETWEEN CLIENT AND SERVER

(71) Applicant: Samsung Electronics Co., Ltd., Gyeonggi-do (KR)

(72) Inventors: Je-Young Maeng, Gyeonggi-do (KR); Sung-Jin Park, Gyeonggi-do (KR); Jun-Hyung Kim, Gyeonggi-do (KR)

(73) Assignee: Samsung Electronics Co., Ltd (KR)

(*) Notice: Subject to any disclaimer, the term of this patent is extended or adjusted under 35 U.S.C. 154(b) by 135 days.

(21) Appl. No.: 14/178,872

(22) Filed: Feb. 12, 2014

(65) Prior Publication Data
US 2014/0229627 A1    Aug. 14, 2014

(30) Foreign Application Priority Data

Feb. 12, 2013 (KR) .................. 10-2013-0015070
Feb. 27, 2013 (KR) .................. 10-2013-0021489

(51) Int. Cl.
| | | |
|---|---|---|
| *G06F 15/16* | (2006.01) | |
| *H04L 29/08* | (2006.01) | |
| *H04L 29/06* | (2006.01) | |
| *H04W 8/00* | (2009.01) | |

(52) U.S. Cl.
CPC .......... *H04L 67/16* (2013.01); *H04L 65/1069* (2013.01); *H04L 65/4069* (2013.01); *H04L 67/12* (2013.01); *H04W 8/005* (2013.01)

(58) Field of Classification Search
None
See application file for complete search history.

(56) References Cited

U.S. PATENT DOCUMENTS

| | | | | |
|---|---|---|---|---|
| 2003/0217136 A1* | 11/2003 | Cho | ............ | H04L 12/2818 709/223 |
| 2004/0073609 A1* | 4/2004 | Maekawa | ............ | H04L 29/06 709/203 |
| 2004/0249906 A1* | 12/2004 | Olbricht | ............ | H04L 29/12009 709/220 |
| 2005/0102369 A1* | 5/2005 | Kim | ............ | H04L 12/2803 709/213 |

(Continued)

FOREIGN PATENT DOCUMENTS

| WO | WO 2012/115385 | 8/2012 |
|---|---|---|
| WO | WO 2014/070623 | 5/2014 |

OTHER PUBLICATIONS

Smartphone apps in cars (Smartphone apps in cars: an introduction to MirrorLink—Mar. 23, 2012, http://www.transportationtechnologyventures.com/blog/2012/03/smartphone-apps-in-cars-an-introduction-to-mirrorlink/).*

(Continued)

*Primary Examiner* — Brian Whipple
*Assistant Examiner* — Gregory P Tolchinsky
(74) *Attorney, Agent, or Firm* — The Farrell Law Firm, P.C.

(57) ABSTRACT

A method for connection between a server and a client includes discovering, by the server, a client through a device discovery procedure, transmitting device-related information of the server to the client, or receiving the device-related information from the client, connecting with the client, and performing a Universal Plug and Play (UPnP) operation through the connection.

12 Claims, 9 Drawing Sheets

(56) References Cited

U.S. PATENT DOCUMENTS

| | | | |
|---|---|---|---|
| 2006/0187873 A1* | 8/2006 | Friday | H04W 48/20 370/328 |
| 2007/0115996 A1* | 5/2007 | Shitano | H04L 12/2803 370/392 |
| 2008/0077650 A1* | 3/2008 | Jared | H04L 12/2809 709/203 |
| 2008/0098088 A1* | 4/2008 | Tamano | H04L 12/2809 709/218 |
| 2009/0192853 A1 | 7/2009 | Drake et al. | |
| 2009/0304019 A1* | 12/2009 | Chan | H04L 12/18 370/432 |
| 2010/0115067 A1* | 5/2010 | Brant | H04L 29/12216 709/221 |
| 2011/0082922 A1* | 4/2011 | Ahn | H04L 12/2805 709/223 |
| 2011/0107388 A1 | 5/2011 | Lee et al. | |
| 2011/0149806 A1 | 6/2011 | Verma et al. | |
| 2011/0307589 A1* | 12/2011 | Reiss | H04L 61/103 709/223 |
| 2012/0215842 A1 | 8/2012 | Maeng et al. | |
| 2012/0259947 A1 | 10/2012 | Park | |
| 2013/0003624 A1 | 1/2013 | Huang et al. | |
| 2013/0005343 A1 | 1/2013 | Kim et al. | |
| 2013/0123943 A1* | 5/2013 | Igarashi | G05B 19/02 700/1 |
| 2014/0132504 A1* | 5/2014 | Alder | H04L 12/2803 345/156 |

OTHER PUBLICATIONS

CCC Unveils MirrorLink (Car Connectivity Consortium Unveils MirrorLink Roadmap, Sep. 29, 2011, https://web.archive.org/web/20120610035423/http://mirrorlink.com/img/CCC%20Summit%20Press%20Release_9_29_11.pdf).*

European Search Report dated Aug. 25, 2016 issued in counterpart application No. 14752084.5-1870, 9 pages.

* cited by examiner

METHOD AND APPARATUS FOR CONNECTION BETWEEN CLIENT AND SERVER

PRIORITY

This application claims priority under 35 U.S.C. §119(a) to a Korean patent application filed in the Korean Intellectual Property Office on Feb. 12, 2013 and assigned Serial No. 10-2013-0015070 and a Korean patent application filed in the Korean Intellectual Property Office on Feb. 27, 2013 and assigned Serial No. 10-2013-0021489, the content of both of which is incorporated herein by reference.

BACKGROUND OF THE INVENTION

1. Field of the Invention

The present invention relates to a method and apparatus for connection between a client and a server.

2. Description of the Related Art

Electronic devices for vehicular control using Information Technology (IT) have been increasingly utilized. In addition, the electrical and electronic equipments applied to vehicles have increased in number and complexity.

For example, a head unit is recognized as one of the most important devices. The head unit is usually located in between the front seats of the car and is the control device for thermostats (such as air conditioner and heater), an entertainment system, a rear camera display, and a navigation system for the vehicle.

Buttons for manipulating the head unit are frequently mounted on the steering wheel for safety purposes, and these buttons may be considered as part of the head unit.

The user may control various in-vehicle devices using the head unit before, during, and after operating the vehicle. Therefore, a User Interface (UI) of the head unit needs to be simple so that the user may easily and safely manipulate the head unit even while operating the vehicle, and needs to be intuitive so that the user may understand how to control the head unit, without any specific description.

Cellular phones and smart phones differ from the head unit in this regard. For example, a smart phone user may see the UI and manipulate the UI by hand. To this end, the user may continue to view the screen of the smart phone. Accordingly, the smart phone user currently cannot safely manipulate the smart phone while operating a vehicle.

SUMMARY OF THE INVENTION

An aspect of the present invention is to address at least the above-mentioned problems and/or disadvantages and to provide at least the advantages described below. Accordingly, an aspect of the present invention is to provide a method and apparatus for allowing a user (or driver) to safely manipulate a mobile phone while operating the vehicle.

Another aspect of the present invention is to provide a method and apparatus for reducing a connection time between a mobile phone and a head unit, and resources required for the connection.

In accordance with an aspect of the present invention, there is provided a method for connection between a server and a client, including discovering, by the server, a client through a device discovery procedure, transmitting device-related information of the server to the client, or receiving the device-related information from the client, connecting with the client, and performing a Universal Plug and Play (UPnP) operation through the connection.

In accordance with an aspect of the present invention, there is provided a method for connection between a server and a client, including performing, by the client, a device discovery procedure with the server, receiving device-related information of the server, or transmitting the device-related information to the server, allocating an IP to the server, connecting with the server, and starting a UPnP operation through the connection.

In accordance with an aspect of the present invention, there is provided an apparatus for connection between a server and a, including the server that has a receiving unit configured to discover a client through a device discovery procedure, and transmit device-related information of the server to the client, or receive the device-related information from the client, and a controller configured to connect with the client, and perform a UPnP operation through the connection.

In accordance with an aspect of the present invention, there is provided an apparatus for connection between a server and a client, including the client that has a transmitting unit configured to perform a device discovery procedure with the server, and receive device-related information of the server, or transmit the device-related information to the server, and a controller configured to allocate an IP to the server, connect with the server, and start a UPnP operation through the connection.

BRIEF DESCRIPTION OF THE DRAWINGS

The above and other aspects, features and advantages of certain embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EMBODIMENTS OF THE INVENTION

The following description with reference to the accompanying drawings is provided to assist in a comprehensive understanding of embodiments of the invention as defined by the claims and their equivalents. Those of ordinary skilled in the art will recognize that various changes and modifications of the embodiments described herein can be made without departing from the scope and spirit of the invention. In addition, descriptions of well-known functions and constructions may be omitted for the sake of clarity and conciseness.

The present invention provides a method for allowing a user to manipulate a cellular phone using a head unit including a UI specialized for allowing the user to safely manipulate a mobile phone while operating a vehicle, thereby ensuring both the sustainable use of a smart phone and the driver's safety.

To this end, the present invention discloses mirroring technology for providing a network connection (e.g., wired connection and wireless connection) between a vehicle's head unit and a cellular phone, controlling features of the cellular phone through the head unit, and transmitting the cellular phone's UI to the head unit.

Figure 1:
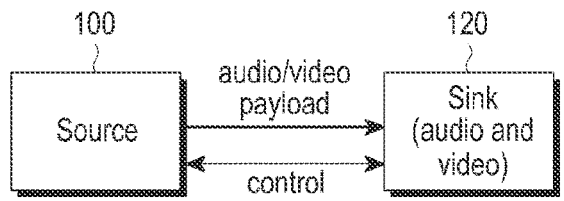
FIG. 1 illustrates a Wi-Fi Display (WFD) structure to which the present invention is applied.

FIG. 1 illustrates a structure of a Wi-Fi Display (WFD) system to which the present invention is applied.

The WFD system includes a WFD Source 100 and a WFD Sink Device 120, and is for transmitting a screen displayed on a display of the WFD Source Device 100 and audio content played thereon to the WFD Sink device 120 in real time. For example, assuming that the WFD Source Device 100 is a cellular phone and the WFD Sink Device 120 is a Television (TV), it is possible for the user to watch the UI or the movie that the user is watching on the cellular phone, even on a large screen such as the TV. In this case, the user may control the UI on the WFD Source Device 100 or the WFD Sink Device 120, and in the latter case a user input may be transmitted from the WFD Sink Device 120 to the WFD Source Device 100.

Figure 2:
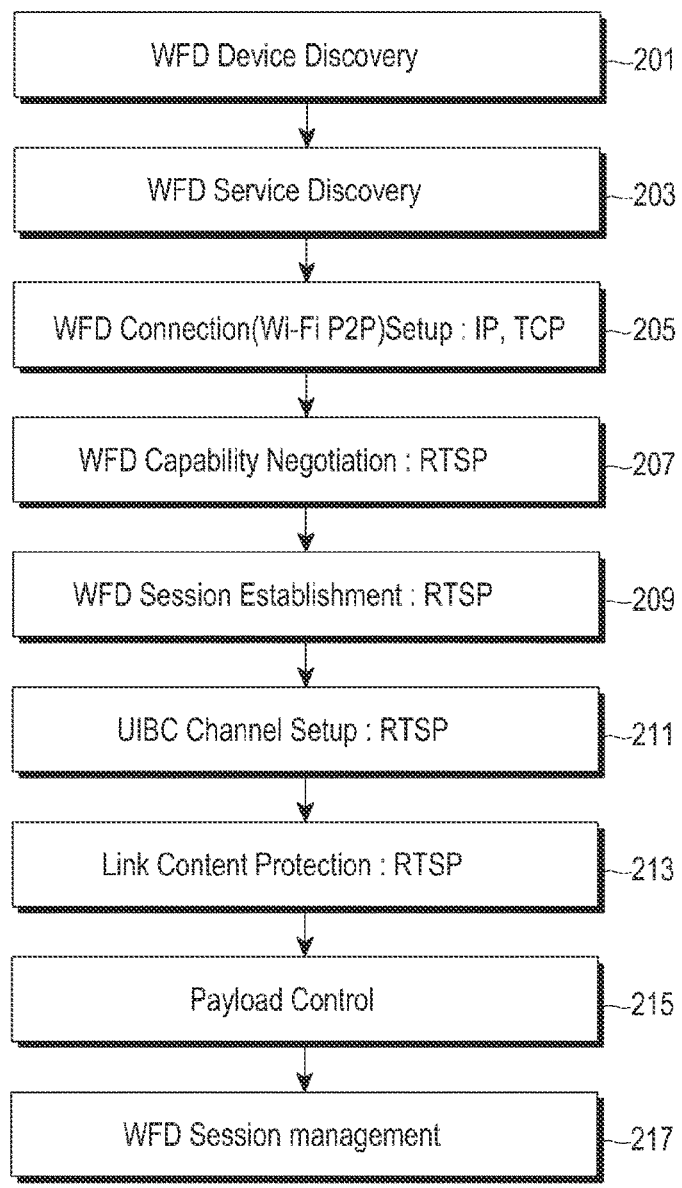
FIG. 2 illustrates a WFD setup process to which the present invention is applied.

FIG. 2 illustrates a WFD setup process to which the present invention is applied.

A WFD Source Device may discover a device supporting WFD (e.g., WFD Sink Device) through a WFD Device Discovery process in step 201, and check additional information through a WFD Service Discovery process in step 203. The WFD Source Device may set up an IP channel and a Transmission Control Protocol (TCP) channel through a WFD connection Setup process in step 205, and perform a WFD Capability Negotiation process in step 207 through a Real Time Streaming Protocol (RTSP). The WFD Source Device may establish a WFD session through the RTSP protocol in step 209, and then, set up a User Input Back Channel (UIBC) through the RTSP protocol so that the WFD Sink Device 120 may control the WFD Source Device 100, in step 211. The WFD Source Device may then undergo a Link Content Protection process in step 213 through the RTSP protocol, for channel protection during data transmission, and then transmit content of the WFD Source Device 100 to the WFD Sink Device 120 in steps 215 and 217.

WFD has been used for transmitting a screen on a display of the Source Device 100 to the Sink Device 120, but this technology has been commonly used to transmit content of a cellular phone to an in-home large-screen display such as TV. The following problems arise in applying WFD to the vehicle.

1. Due to the vehicle head unit-related regulations, there is a need for a means for preventing a specific application that does not meet the regulations, from undergoing mirroring.

2. Since hardware buttons of the WFD Source Device cannot be transmitted to the WFD Sink Device because the buttons are outside a display of the WFD Source Device, there is a need for a manner to control the relevant operations (e.g. Terminate application, Change application layer-foreground, and background).

3. There is a need for a common channel for sending data from the WFD Sink Device to the WFD Source Device, as such a channel does not presently exist. An example of the data is illustrated in Table 1 as follows.

TABLE 1

| Example of data | Description |
| --- | --- |
| Status of vehicle | Current air pressure, fault diagnosis (Diagnostics information) |
| GPS data | Transmission of information using the vehicle's high-performance Global Positioning System (GPS) |

4. If the user desires to place a call with a cellular phone through the head unit in the vehicle, there is a need for a channel capable of sending the voice from the WFD Sink Device to the WFD Source Device, as such a channel does not presently exist.

To these ends, the present invention applies UPnP, which is the home network technology, and eliminates the technical barriers that may arise when the UPnP technology is applied.

Figure 3:
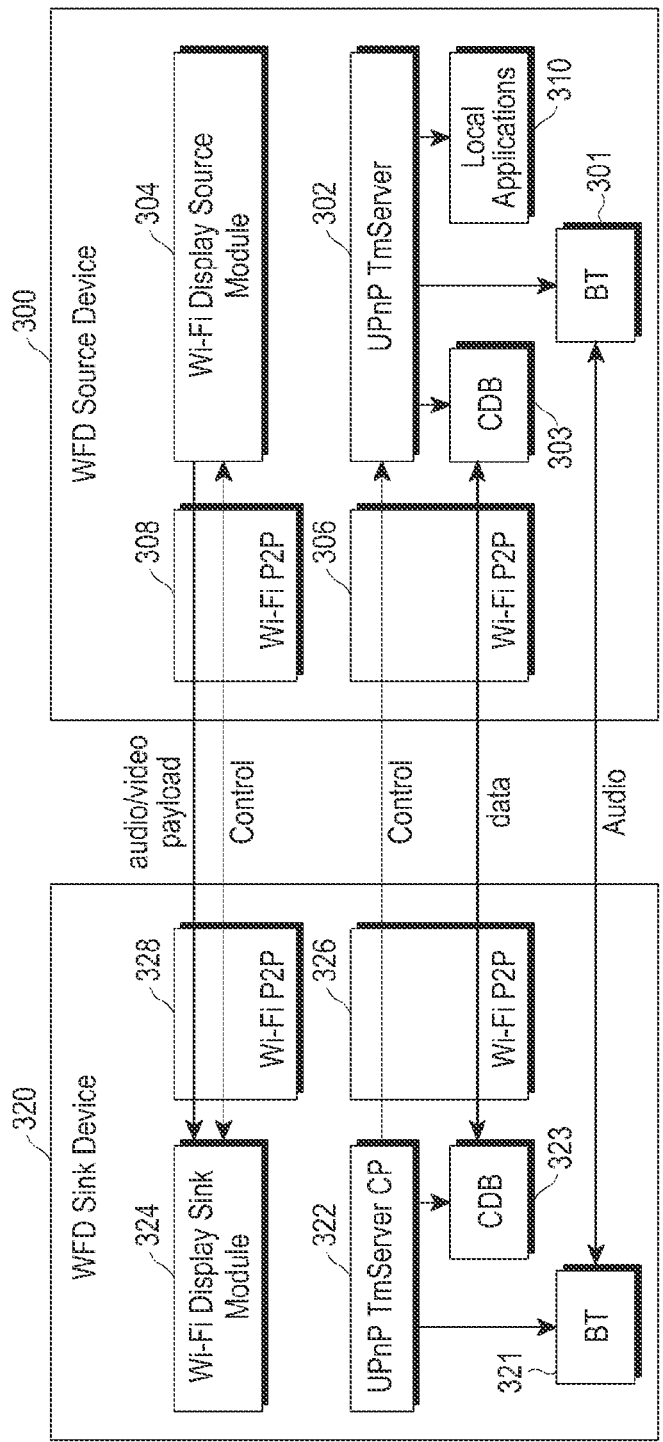
FIG. 3 illustrates a WFD structure according to a first embodiment of the present invention.

FIG. 3 illustrates a WFD structure according to a first embodiment of the present invention.

Although a WFD Sink Device 320 and a WFD Source Device 300 are illustrated in FIG. 3 by example, these devices may be replaced by a Mirrolink Client and Mirrorlink Server, for example.

A UPnP TmServer CP 322 may exist inside the WFD Sink Device 320, and may exist separately from a Wi-Fi Display Sink Module 324. The UPnP TmServer CP 322 may discover and control a UPnP TmServer 302 in the WFD Source Device 300, using a Wi-Fi P2P Connection which is separate from that of the Wi-Fi Display Sink Module 324. The Wi-Fi Display Sink Module 324 and WFD Display Source Module 304 may use a Wi-Fi P2P Connection 328 and a Wi-Fi P2P Connection 308, respectively, and the UPnP TmServer CP 322 and the UPnP TmServer 302 may use a Wi-Fi P2P Connection 326 and a Wi-Fi P2P Connection 306, respectively.

The WFD modules (e.g., the Wi-Fi Display Sink Module 324 and the WFD Display Source Module 304) and the UPnP modules (e.g., the UPnP TmServer CP 322 and the UPnP TmServer 302) do not exchange information between each other, since they operate as completely independent processes.

The UPnP TmServer CP 322 may receive an Application List from the UPnP TmServer 302, run or stop a specific application based on the Application List, and change Application Status (foreground or background operating).

In this manner, the UPnP TmServer CP 322 may run or stop a Common Data Bus (CDB) 303, a Bluetooth® (BT) device 301, and other Local Applications 310 in the WFD Source Device 300, and may simultaneously control a BT module 321 and a CDB module 323 in the WFD Sink Device 320. In this manner, the UPnP TmServer CP 322 may generate or remove separate audio and data channels.

In addition, the Local Applications 310 may include a Real Time transport Protocol (RTP) Server/Client, and the UPnP TmServer CP 322 may generate an audio channel that does not use BT, by controlling the RTP Server/Client in the WFD Source Device 300 and the RTP Server/Client in the WFD Sink Device 320. The generated audio channel may be used as a substitute for an audio channel that uses the BT.

Figure 4:
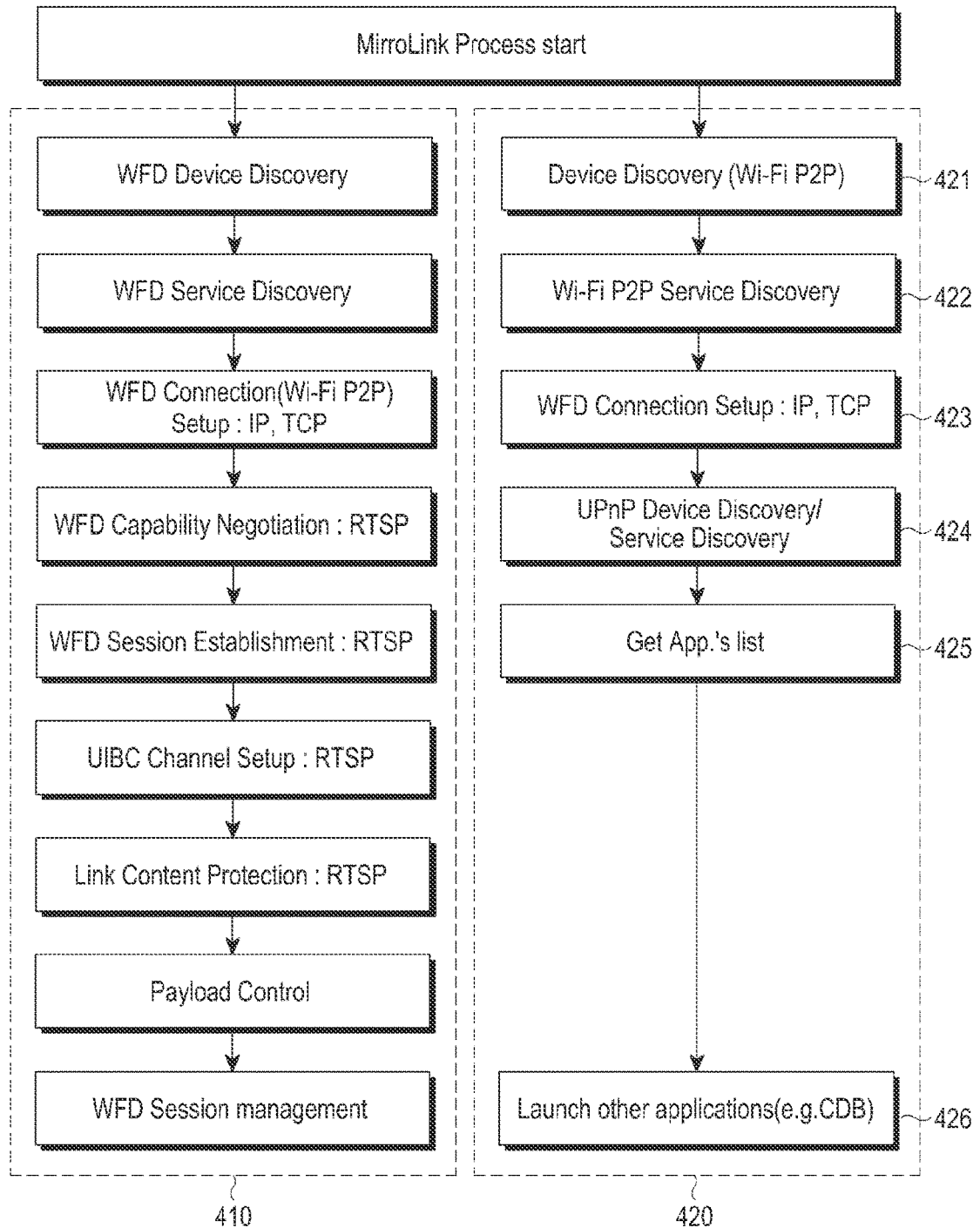
FIG. 4 illustrates a WFD setup process according to a first embodiment of the present invention.

FIG. 4 illustrates a WFD setup process according to a first embodiment of the present invention.

In FIG. 4, WFD and UPnP may operate separately. A WFD process 410 and a UPnP process 420 may follow the steps defined in WFD and UPnP TmServer, respectively. The WFD process 410 is the same as that in FIG. 2.

The UPnP process 420 may operate as follows.

A WFD Source Device may discover a device supporting Wi-Fi P2P (e.g., WFD Sink Device) through a Device Discovery process in step 421, and share service information between the WFD Sink Device and the WFD Source Device through a Wi-Fi P2P Service Discovery process in step 422. Thereafter, the WFD Source Device may set up IP and TCP channels through a WFD connection Setup process in step 423, discover a device supporting UPnP through a UPnP Device Discovery/Service Discovery process in step 424, and share UPnP service information between the WFD Sink Device and the WFD Source Device.

The UPnP process 420 may obtain an application list in a Get App's List process in step 425, and launch other applications (e.g., CDB) in a Launch Other Applications process in step 426.

In order to operate the UPnP process 420, UPnP uses Wifi P2P technology, for packet transmission, but UPnP disadvantageously needs to drive and separately operate a plurality of Media Access Control/PHYsical (MAC/PHY) layers, since its format does not match the format of Wifi P2P used in WFD.

In short, by incorporating the UPnP TmServer into the existing WFD Sink Device and WFD Source Device, it is possible to solve the Application Filtering problems presented in the existing technology, and the problems that the hardware buttons cannot be controlled and the data and audio channels do not exist.

Figure 5:
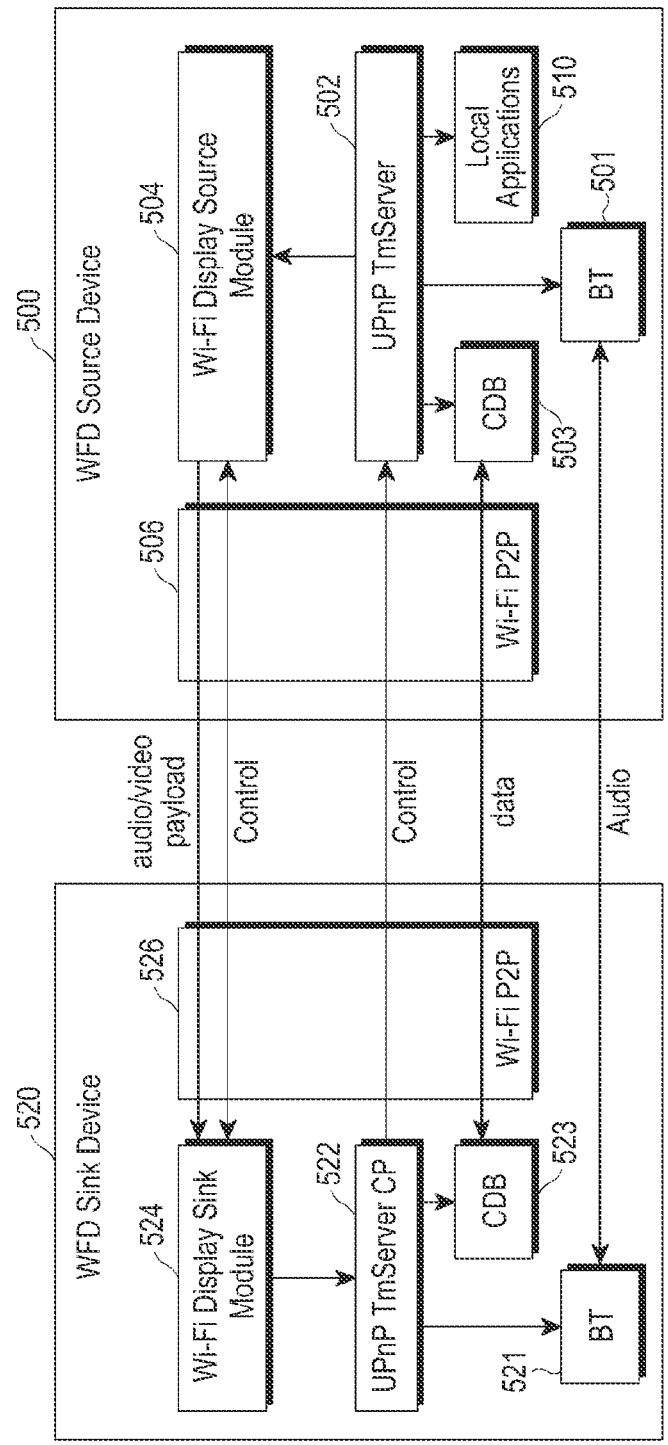
FIG. 5 illustrates a WFD structure according to a second embodiment of the present invention.

FIG. 5 illustrates a WFD structure according to a second embodiment of the present invention.

As in the first embodiment of the present invention, a UPnP TmServer CP 522 may exist in a WFD Sink Device 520, and may exist separately from Wi-Fi Display Sink Module 524.

However, the UPnP TmServer CP 522 may discover a UPnP TmServer 502 in a WFD Source Device 500 using an RTSP message exchanged between the Wi-Fi Display Sink Module 524 and a Wi-Fi Display Source Module 504, by using a Wi-Fi P2P Connection which is the same as that of the Wi-Fi Display Sink Module 524.

The process after the discovery is the same as that of the normal UPnP scheme. If a part of the UPnP process is replaced using RTSP in this manner, the following advantages are realized.

The Addressing and Discovery processes defined in UPnP Device Architecture (DA) may be omitted. The UPnP process 420 that is separately performed in UPnP is the process that has been performed in the WFD process 410. Therefore, by replacing the UPnP process 420 with the WFD process 410, it is possible to prevent unnecessary redundancy and reduce the connection time between the two devices.

A process of receiving a device description may be omitted from the Description process. Accordingly, the time required for parsing eXtensible Markup Language (XML) and the processing resources may also be reduced or saved.

Figure 6:
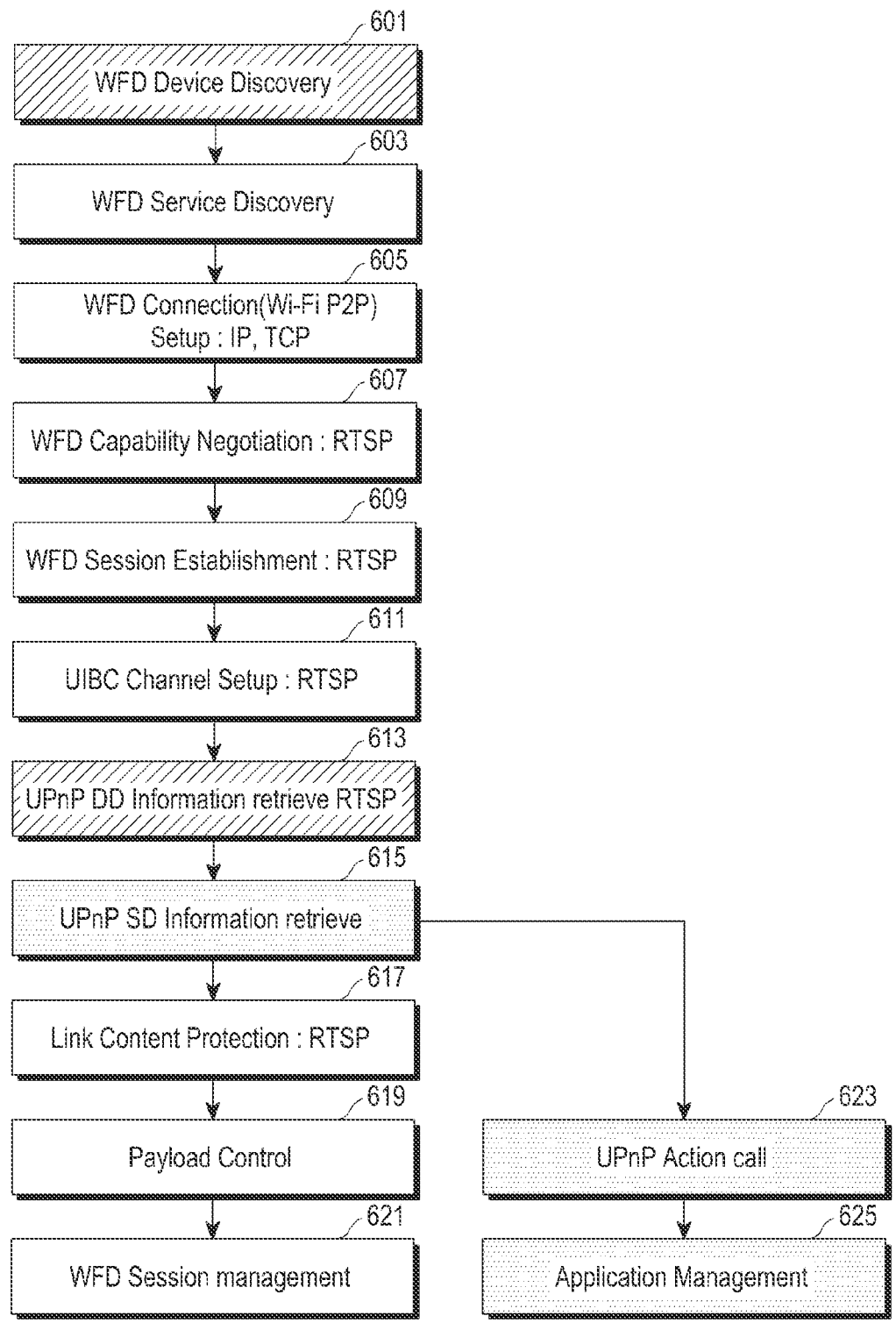
FIG. 6 illustrates a WFD setup process according to a second embodiment of the present invention.

FIG. 6 illustrates a WFD setup process according to a second embodiment of the present invention.

Step 601, which is a process of discovering a WFD Device, may correspond to a process of exchanging device information through an Information Element (IE), in WFD. In step 601, a variety of Device information related to the devices may be exchanged. An IE may be subdivided into Sub Elements (SEs), and each of the SEs may be identified by a Subelement ID. For example, if a Subelement ID is 1, its SE may indicate WFD Device Information, and if a Subelement ID is 2, its SE may indicate WFD Audio Format, i.e., an audio format supported by the WFD Device. In WFD, a total of 11 Subelement IDs have been defined.

UPnP-related modules are defined in FIG. 5, but are not defined in the existing WFD. Therefore, WFD Devices may not determine whether the above modules are included therein, if there is no separate information. In the present invention, new Device Information is added to enable the determination of whether the other device includes the above modules (e.g., UPnP TmServer CP), in step 601 in FIG. 6. A Subelement ID has a value of 11, and its detailed format is defined in Table 2 and Table 3.

TABLE 2

| Field | Size (octets) | Value | Description |
|---|---|---|---|
| Subelement ID | 1 | 11 | Identifier indicating Subelement including Device information indicating proposed devices added to WFD |
| Length | 2 | 6 | the length of sum of following elements |
| WFD UPnP Device Information | 6 | | Value of data defined in Table 3 |

TABLE 3

| Bits | Name | Interpretation |
|---|---|---|
| 0 | WFD UPnP Device type | 0b0: TmServerDevice<br>0b1: TmServerDevice CP |
| 47:1 | Reserved | Set to Zero |

By exchanging the above information and checking the data, a Subelement ID of which has a value of 11, WFD Devices may determine whether the discovered device is the existing WFD Device, or a device having the modules added in the present invention. Thereafter, in step 601, the WFD Devices may determine whether to perform the added steps 613, 615, 623 and 625, based on the above information.

Table 2 and Table 3 illustrate a data format available according to an embodiment of the present invention, and the features (e.g., information such as manufacturer, model, and year of manufacture) of the devices may also be included in a similar manner. To this end, the space of 1 to 47 bits may be used.

Steps 603 to 611 represent the process of setting up a WFD Session between the WFD Source Device 500 and the WFD Sink Device 520, and will not be described since steps 603 to 611 are similar to the WFD description in steps 203 to 211 in FIG. 2.

When step 611 is completed, an RTSP Session is established between the WFD Source Device and the WFD Sink Device, and a UIBC channel is also set up, which can carry a user input to the WFD Source Device if the user manipulates the screen of the UFD Sink Device.

Hatching-marked steps 615, 623 and 625 following step 613 may be the same as the Service Description transmission/reception and Action Control processes of the existing UPnP, and may reuse a TmServerDevice service of the Mirrorlink standard defined in Car Connectivity Consortium (CCC).

White-marked steps 617, 619 and 621 following step 615 may be the same as steps 213 to 217 in FIG. 2.

In FIG. 6, step 613 may correspond to a process in which the WFD Sink Device receives Device information of the WFD Source Device, using GET_PARAMETER Method defined in Real-Time Streaming Protocol (RTSP), as follows.

Figure 7:
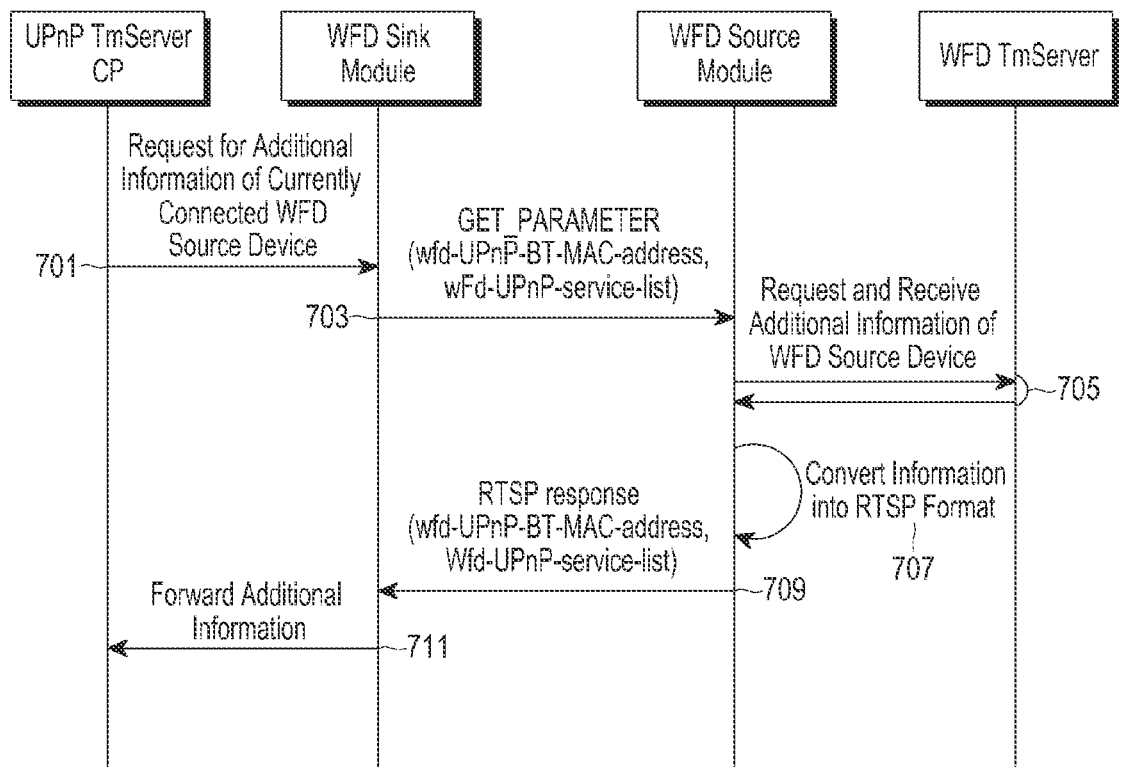
FIG. 7 illustrates an operation between a WFD Sink Device and a WFD Source Device according to a second embodiment of the present invention.

In order to replace the above process, each of the modules in FIG. 5 may perform the operation in FIG. 7.

FIG. 7 illustrates an operation between a WFD Sink Device and a WFD Source Device according to a second embodiment of the present invention.

In step 701, a UPnP TmServer CP may request Device information (e.g., additional information) of the currently connected WFD Source Device from a Wi-Fi Display Sink Module.

In step 703, upon receiving the request, the Wi-Fi Display Sink Module may request the additional information from a Wi-Fi Display Source Module using RTSP.

In step 705, upon receiving the request, the Wi-Fi Display Source Module may re-request the additional information of the WFD Source Device from a UPnP TmServer, and receive the requested additional information.

In step 707, the Wi-Fi Display Source Module may convert the received additional information into an RTSP format.

In step 709, the Wi-Fi Display Source Module may transmit the converted additional information to the Wi-Fi Display Sink Module by including the information in a RTSP response.

In step 711, the UPnP TmServer CP may receive the converted additional information from the Wi-Fi Display Sink Module, and perform a UPnP Control Process based on the converted additional information.

The UPnP TmServer CP may receive an Application List from the UPnP TmServer, run or stop a specific application based on the Application List, and change the Application Status (foreground or background operating).

An example of the above-mentioned additional information and a data format for transmitting the information with RTSP is as follows. In the present invention, in addition to the presented information, the Device information which is not provided in the existing WFD Device Discover, Service Discovery, and Capability Negotiation processes may be exchanged between WFD Devices through the same processes as the above processes.

1. Bluetooth MAC Address

Since WFD is technology for transmitting video and audio of a WFD Source Device to a WFD Sink Device using WiFi, voice may not be transmitted from the WFD Sink Device to the WFD Source Device. In order to overcome these shortcomings, there is a need for a channel capable of voice transmission. To this end, in the present invention, an audio channel may be transmitted using a Hands Free Profile (HFP) defined in BT. For this purpose, a Bluetooth® MAC Address is needed, and is transmitted in step 613.

The syntax of Bluetooth MAC address is as follows.
RTSP Bluetooth MAC address data format
wfd-upnp-BT-MAC-address=12*12HEXDIG; CRLF 2. Service List
  a) SCPDURL
  b) ControlURL
  c) EventSubURL The syntax of RTSP Service List data format is as follows.
RTSP Service List Data Format
wfd-upnp-service-list="none"/TmApplicationServer SP TmClientProfile SP Tm NotificationServer CRLF
TmApplicationServer="none"/SCPDURL SP ControlURL SP EnventSubURL
SCPDURL="none"/("http://source-ip-address/SCPD/")
ControlURL="none"/("http://source-ip-address/Control/")
EventSubURL="none"/("http://source-ip-address/EventSub/")
source-ip-address=IPADDRESS
TmClientProfile="none"/SCPDURL SP ControlURL SP EnventSubURL
TmNotificationServer="none"/SCPDURL SP ControlURL SP EnventSubURL Based on the information exchanged in this manner, the UPnP TmServer CP may control the UPnP TmServer in the WFD Source Device in a manner of invoking UPnP Action, may run or stop CDB, BT and other Local Applications, and may also control the BT and CDB modules in the WFD Sink Device, thereby making it possible to generate or remove separate audio and data channels.

In addition, the Local Applications may include RTP Server/Client, and the UPnP TmServer CP may control the RTP Server/Client in the WFD Source Device and the RTP Server/Client in the WFD Sink Device, and generate an audio channel that does not use BT. The generated audio channel may be used as a substitute of an audio channel that uses the BT.

In short, by incorporating the UPnP TmServer into the existing WFD Sink Device and WFD Source Device, removing some redundant processes and introducing new processes, it is possible to more efficiently solve the Application Filtering problems presented in the existing technology, and the problems that the hardware buttons cannot be controlled and the data and audio channels do not exist, compared to the first embodiment of the present invention.

Figure 8:
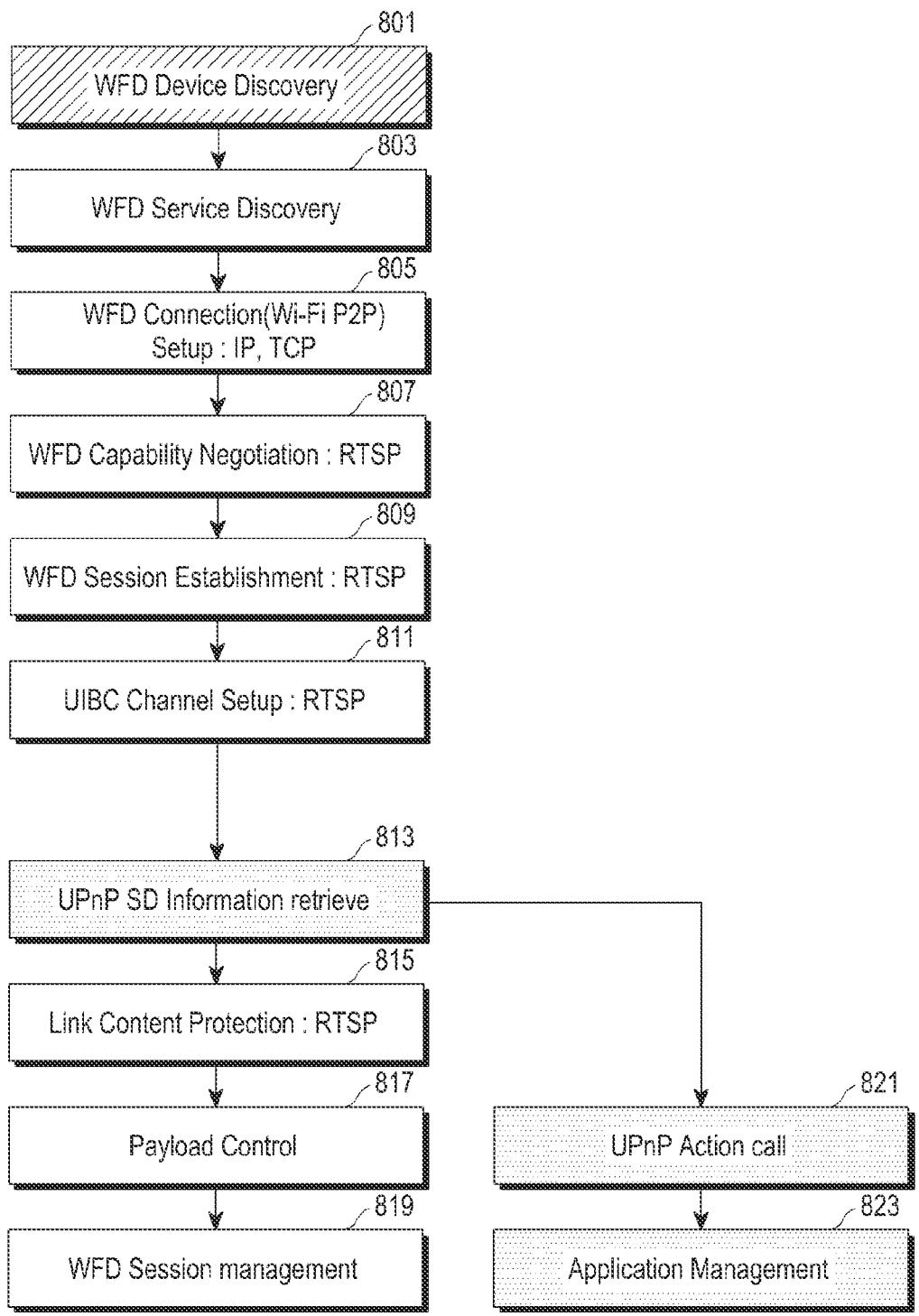
FIG. 8 illustrates a WFD setup process according to a third embodiment of the present invention.

FIG. 8 illustrates a WFD setup process according to a third embodiment of the present invention.

The third embodiment of the present invention is similar to the second embodiment of the present invention, except that the information exchanged in step 613 may be sent through a payload of Sub Element (with ID=11) in an IE in step 801.

As in the second embodiment of the present invention, in addition to the presented information, the Device information which is not provided in the existing WFD Device Discover, Service Discovery, and Capability Negotiation processes may be exchanged between WFD Devices based on the WFD IE information in the third embodiment of the present invention.

Figure 9:
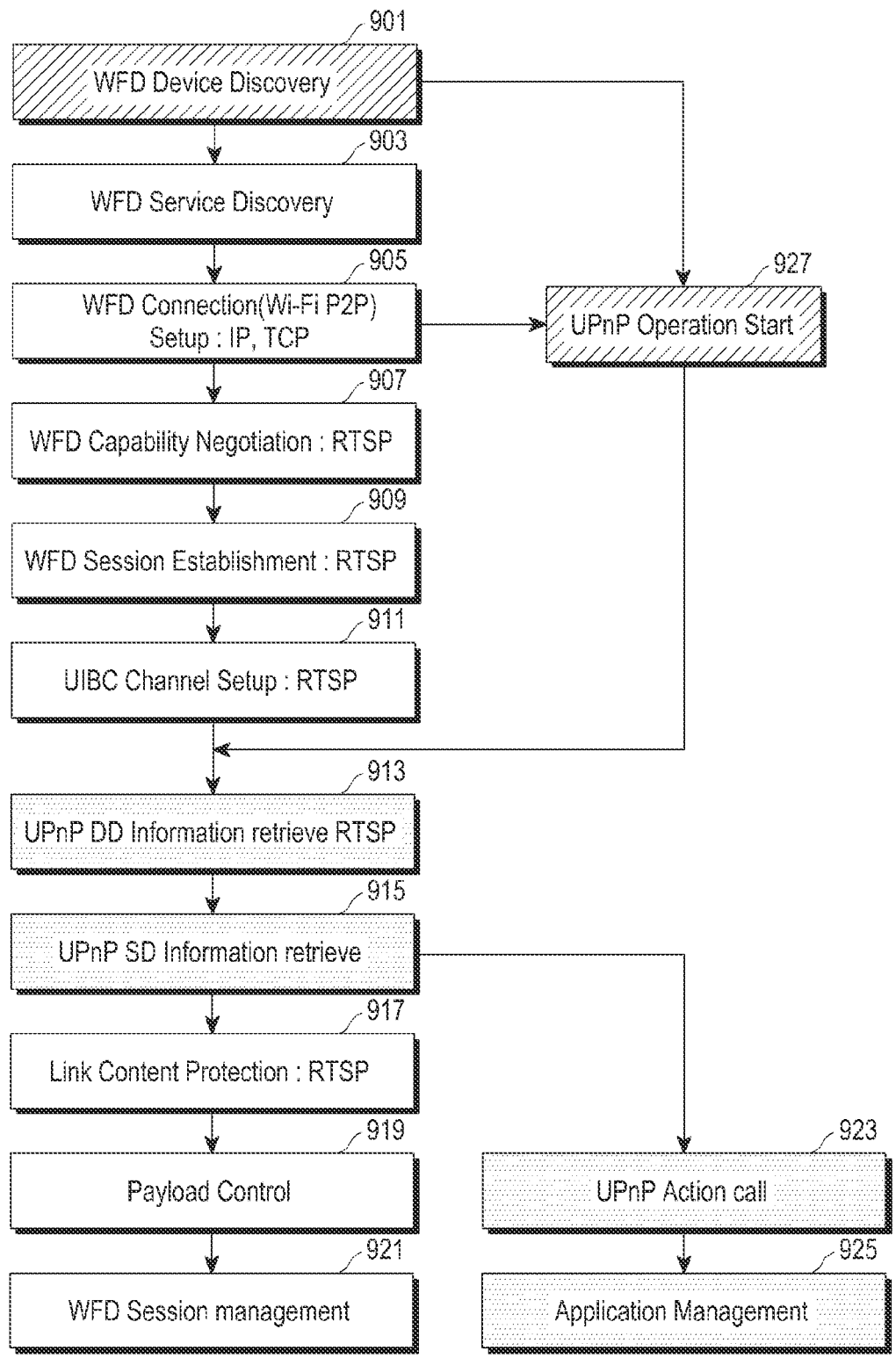
FIG. 9 illustrates a WFD setup process according to a fourth embodiment of the present invention.

FIG. 9 illustrates a WFD setup process according to a fourth embodiment of the present invention.

The fourth embodiment of the present invention is similar to the third embodiment of the present invention, except as to the type of the data exchanged in step 901, and in that the existing WFD process may be used intact, and the remaining processes except for Simple Service Device Discovery (SSDP) among the UPnP processes may also be used intact, contributing to an increase in the reusability of the existing technology.

By combining the Device Discovery process provided in WFD with the Device Discovery process among the UPnP DA processes followed by Addressing, SSDP, Device Description, and Service Description, to remove the Device Discovery process which is unnecessarily repeated, it is possible to reduce the time required in the setup process. In addition, the order of the UPnP Device Discovery process performed after the Wi-fi Connection setup process of step 905 may be shifted back to the first WFD Device Discovery process, to notify the user whether the device can use the MirrorLink (ML) function, before performing steps 903 to 911, so that steps 903 to 911 do not have to be performed.

Figure 10:
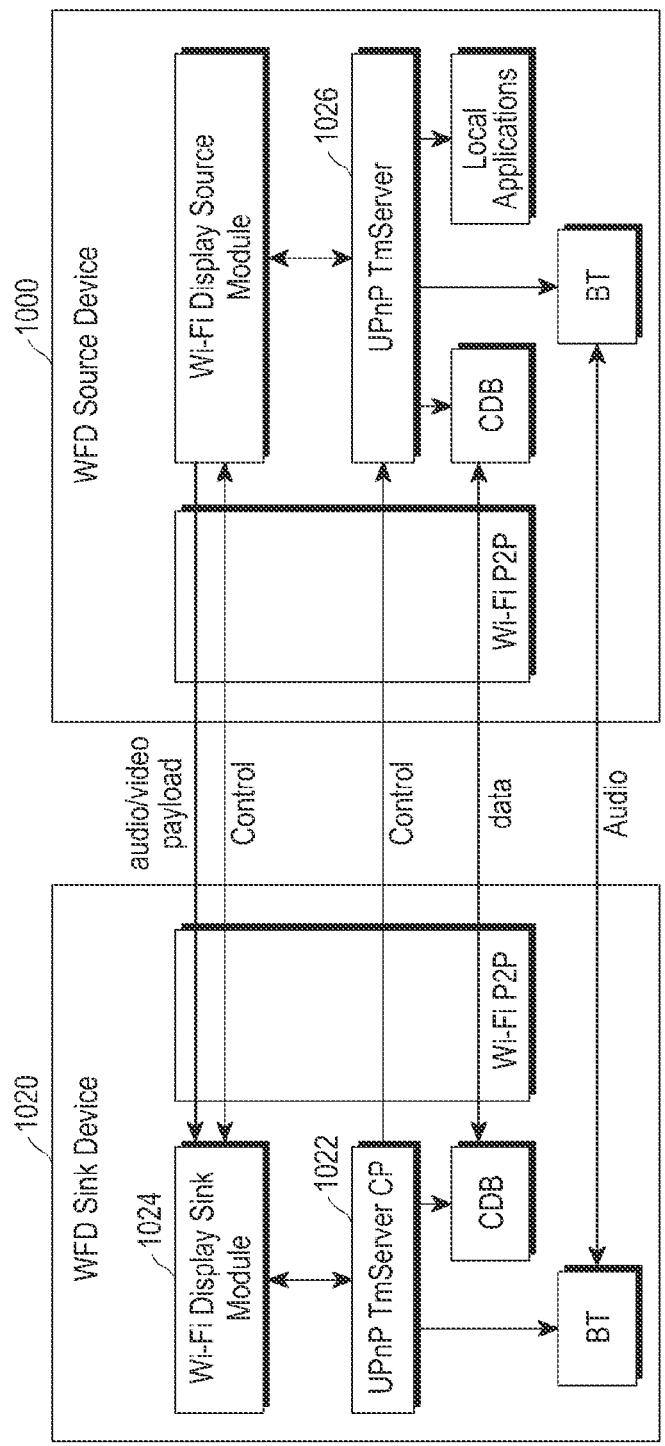
FIG. 10 illustrates a WFD structure according to a fourth embodiment of the present invention.

FIG. 10 illustrates a WFD structure according to a fourth embodiment of the present invention.

The structure in FIG. 10 is very similar to the structure in FIG. 5 of the second embodiment of the present invention, but the steps are slightly different.

In the fourth embodiment of the present invention, there are the following two technical problems in exchanging SSDP information through the process WFD Device Discovery process.

First, a WFD Frame has no space where SSDP information used in UPnP can be displayed. Although Wifi Association (WFA) has defined the fields reserved for the expansion of WFD technology, if outside organizations arbitrarily use the fields without approval of the WFA, conflict is likely to occur when the WFA updates WFD to its new version.

Second, the WFD Frame is information exchanged in Layer 2 (L2). Generally, a message is configured on a bit basis, and its meaning is determined depending on the bit value. Therefore, the Frame is smaller in size than a packet of the upper layer protocol (e.g., http), whereas the frequency at which the Frame is exchanged is high. Thus, a change in the size of the WFD Frame may more significantly affect the overall operation of the network, compared to the upper layer protocol.

Generally, the message exchanged through SSDP is made up of texts, and it will be apparent to those of ordinary skill in the art that if the text information is inserted in the WFD Frame intact, the message size may abnormally increase.

In order to solve these problems, the fourth embodiment of the present invention presents a method to minimize the WFD's impact on the Frame format, and a method to reduce the amount of data that is actually added.

To this end, the format of the ML Frame to be exchanged in step 901 has been defined. In step 901, the WFD Source Device and the WFD Sink Device exchange data frames to discover each other, and the detailed format thereof is defined in Table 4 as follows.

TABLE 4

| Field | Size (octets) | Value | Description |
| --- | --- | --- | --- |
| Element ID | 1 | DD | ID assigned to Vendor specific usage in 802.11 |
| Length | 1 | Variable | Length of following information |
| Organizationally Unique Identifier (OUI) | 3 | XX-XX-XX | Car Connectivity Consortium (CCC) Specific OUI assigned to each organization in 802.11 |
| OUI Type | 1 | 0A | Indicate type and version of CCC ML IE. 0x0A indicates CCC ML v1.0. |
| ML Subelements | Variable | | One or more MLs exist. |

The format in Table 4 may include Element ID indicating a vendor specific usage, Length indicating the length of the following information elements, Organizationally Unique Identifier (OUI) indicating a CCC service, and UPnP Type indicating supportable UPnP device type.

Table 4 shows an IE Frame Format according to the fourth embodiment of the present invention, and the Format is determined by changing the frame format of Vendor specific IE defined in 802.11.

According to the existing technology, WFA is assigned an OUI for WFA in the Frame format from IEEE, uses the OUI for the purpose of transmitting an IE for WFA, and defines the OUI Type, for WFD.

As described above, if the Frame format for WFA and WFD is expanded to insert ML data as in the second embodiment of the present invention, the Reserved Field defined in WFD may be generally used. If the Reserved Field is expanded in WFD, a product based on the expanded WFD is likely to conflict with a product manufactured in accordance with the present invention.

Therefore, newly defining OUIs, being assigned the OUIs from IEEE, and independently using the OUIs for CCC and ML, are performed to prevent the foregoing conflict.

The OUI Type may vary in value as the ML version is updated, and if the value is converted into a decimal number, the 10's place may indicate the main-version number (e.g., the number before the decimal point) and the 1's place may indicate the sub-version number (e.g., the number after the decimal point).

ML Subelements Field indicates subelements of the IE, and the data expressed for each Subelement is different, which is described in the following Tables.

TABLE 5

| Field | Size (octets) | Value | Description |
| --- | --- | --- | --- |
| Subelement ID | 1 | | Identifier indicating the type of CCC ML (see Table 6) |
| Length | 2 | Variable | Length of the following information Value of Subelement field |
| Subelements body field | variable | | |

Table 5 represents a format of the Subelement, and a data value of the Subelement may be classified by Subelement ID.

TABLE 6

| Subelement ID (Decimal) | Note |
| --- | --- |
| 0 | ML Device Information |
| 1-255 | Reserved |

Table 6 represents the detailed value and meaning of the Subelement ID. A Reserved Field may be used for further expansion.

TABLE 7

| Field | Size (octets) | Value | Description |
| --- | --- | --- | --- |
| Subelement ID | 1 | 0 | Identifier indicating Subelement including Device information indicating proposed devices added to WFD |
| Length | 2 | 6 | Length of the following information |
| ML UPnP Device Information | 6 | | Value of data defined in Table 3 |

Table 7 represents a format of the Subelement for the case where a value of the Subelement ID is 0, or a format of the Subelement indicating UPnP Device Information. The actual information is written in Table 8.

TABLE 8

| Field | Size (octets) | Values |
|---|---|---|
| 1:0 | ML UPnP Device type | 0b00: TmServerDevice:1 support |
| | | 0b01: TmServerDevice:1 Control Point support |
| | | 0b10: Reserved |
| | | 0b10: Reserved |
| 2 | ML TmApplicationServer Service type availability | 0b0: TmApplicationServer support |
| | | 0b1: TmApplicationServer is not supported |
| 3 | ML TmClientProfile Service type availability | 0b0: TmClientProfile support |
| | | 0b1: TmClientProfile is not supported |
| 4 | ML TmNotificationServer Service type availability | 0b0: TmNotificationServer support |
| | | 0b1: TmNotifikcationServer is not supported |
| 11:5 | ML UPnP Service type availability | Reserved for additional service |
| 19:12 | Port Number | Port number to be used for URL where UPnP Device Description Document is to be received |
| 47:20 | Reserved | |

Table 8 represents the values that are exchanged through SSDP in UPnP DA based on the value of UPnP Device Information Subelement. The most important information in the data exchanged in SSDP may include a Device ID and a Service ID supported by the other device, and a URL where a UPnP Device Description Document is to be fetched.

As described above, in the present invention, the format of the message exchanged between the WFD Sink Device and the WFD Source Device is defined in Table 4 to Table 7 according to the fourth embodiment.

In the present invention, in order for step 901 to fully replace the UPnP Device Discovery process, there is a need for a Uniform Resource Locator (URL) indicating the location of Device Description Document that is exchanged through a Device Discovery process. However, in the WFD Device Discovery process, the WFD Sink Device and the WFD Source Device may not generate the above information including an IP, since the WFD Sink Device and the WFD Source Device have not been allocated an IP. Therefore, after fetching only the port information and then being allocated an IP, the devices need to create a URL by combining the IP with the port information. As a possible embodiment, a URL may be generated by combining an IP obtained through the connection setup process, port information obtained through the discovery procedure, and a device description extensible markup language (xml). An example thereof is given in Table 9 as follows.

TABLE 9 http://<IP address of MirrorLink Sever>:"<Port number>"/TmserverDevice/TmServerDevice:1.xml"

When Device information is exchanged through the existing SSDP, receiving the Device information may prove that the other party's UPnP Device is being driven or operated. However, according to the present invention, since the entities exchanging information are not the UPnP TmServer Modules, but the WFD Sink/Source Modules, the exchange of information may not necessarily guarantee the operation of the UPnP TmServer or the UPnP TmServer CP.

Therefore, a process of driving the UPnP Module and a process generating the URL are additionally needed in step 927.

In step 927, whether to drive the UPnP TmServer 1026 and the UPnP TmServerCP 1022 in FIG. 10 may be determined based on the ML UPnP Device Information exchanged in step 901. For example, the WFD Sink Device 1020 may drive the UPnP TmServer CP 1022 if the other device provides the UPnP TmServer 1026, and the WFD Source Device 1000 may drive the UPnP TmServer 1026 if the other device implements the UPnP TmServer CP 1022. Depending on the policy, the UPnP modules may be perpetually driven. However, resources may not be used efficiently if the UPnP modules are perpetually driven.

Step 927 may be performed differently by the WFD Sink Device and the WFD Source Device.

A detailed process of step 927 by the WFD Sink Device is as follows.

1. The WFD Sink Device 1020 may recognize in step 901 that the UPnP TmServer 1026 exists in the other party's WFD Source Device 1000.

2. The WFD Sink Device 1020 may internally drive the UPnP TmServer CP 1022.

3. The WFD Sink Module 1024 or the WFD Sink Device 1020 has had IP information of the other party's RTSP Server in step 905 or a process of being allocated an IP, making a TCP Connection and establishing an RTSP Session.

4. The WFD Sink Module 1024 or the WFD Sink Device 1020 may generate a URL (e.g., http://IP address of RTSP: Port number by step 901/) by combining the RTSP Server's IP with the Port number obtained in step 901.

5. The WFD Sink Module 1024 or the WFD Sink Device 1020 may transfer the URL to the UPnP TmServer CP 1022.

6. The UPnP TmServer CP 1022 may fetch Device Description using the URL, and its following process is the same as the common ML UPnP Process.

A detailed process of step 927 by the WFD Source Device is as follows.

1. The WFD Source Device 1000 may recognize in step 901 that the UPnP TmServer CP 1022 exists in the other party's WFD Source Device 1020.

2. The WFD Source Device 1000 may internally drive the UPnP TmServer 1026.

3. The following process is the same as the common ML UPnP Process.

The present invention provides a manner of applying WFD to the vehicle environment, and may achieve the foregoing objects and reduce the connection time and the required resources when applying WFD to the vehicle environment.

As is apparent from the foregoing description, the present invention may allow the user or the driver to manipulate a mobile phone in consideration of the safety while operating the vehicle.

The present invention applies WFD to the vehicle environment.

The present invention reduces the connection time and the required resources when applying WFD to the vehicle environment.

While the present invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for connection between a server and a client, the method comprising:
   discovering, by the server, the client through a device discovery procedure;
   transmitting, by the server, to the client, Universal Plug and Play (UPnP) device information of the server, or receiving, by the server, from the client, UPnP device information of the client;
   connecting the server with the client; and
   performing a UPnP operation through the connection based on the UPnP device information,
   wherein the UPnP device information includes type information indicating whether the client includes a UPnP-related module for supporting a mirrorlink,
   wherein the UPnP device information further comprises Uniform Resource Locator (URL) information generated by combining at least two of an Internet Protocol (IP) of the client, a port number obtained through the device discovery procedure, and a Device Description eXtensible Markup Language (XML), and
   wherein the URL information indicates a location of a device description of the client.

2. The method of claim 1, further comprising transmitting UPnP Device Description information requested by the client.

3. The method of claim 1, wherein the UPnP device information further comprises at least one of a subelement identifier having a predetermined value which indicates the client supports an Organizational Unique Identifier (OUI) indicating a Car Connectivity Consortium (CCC) service, OUI Type indicating a supportable UPnP device type, MirrorLink server supportability, TmClientProfile supportability, TmNotification Server role executability, and a port number.

4. A method for connection between a server and a client, the method comprising:
   performing, by the client, a device discovery procedure with the server;
   receiving, by the client, from the server, Universal Plug and Play (UPnP) device information of the server, or transmitting, by the client, to the server, UPnP device information of the client;
   allocating an Internet Protocol (IP) to the server;
   connecting the client with the server; and
   starting a UPnP operation based on the UPnP device information,
   wherein the UPnP device information includes type information indicating whether the client includes a UPnP-related module for supporting a mirrorlink,
   wherein the UPnP device information further comprises Uniform Resource Locator (URL) information generated by combining at least two of an Internet Protocol (IP) of the client, a port number obtained through the device discovery procedure, and a Device Description eXtensible Markup Language (XML), and
   wherein the URL information indicates a location of a device description of the client.

5. The method of claim 4, further comprising requesting UPnP Device Description information from the server.

6. The method of claim 4, wherein the UPnP device information further comprises at least one of a subelement identifier having a predetermined value which indicates the client supports an Organizational Unique Identifier (OUI) indicating a Car Connectivity Consortium (CCC) service, OUI Type indicating a supportable UPnP device type, MirrorLink server supportability, TmClientProfile supportability, TmNotification Server role executability, and a port number.

7. An apparatus for connection between a server and a client, the apparatus comprising:
   a receiver of the server, discovering a client through a device discovery procedure, and either transmitting to the client, a Universal Plug and Play (UPnP) device information of the server or receiving, from the client, UPnP device information of the client; and
   a processor of the server, connecting with the client, and performing a UPnP operation based on the UPnP device information,
   wherein the UPnP device information includes type information indicating whether the client includes a UPnP-related module for supporting a mirrorlink,
   wherein the UPnP device information further comprises Uniform Resource Locator (URL) information generated by combining at least two of an Internet Protocol (IP) of the client, a port number obtained through the device discovery procedure, and a Device Description eXtensible Markup Language (XML), and
   wherein the URL information indicates a location of a device description of the client.

8. The apparatus of claim 7, further comprising a transmitter configured to transmit UPnP Device Description information requested by the client.

9. The apparatus of claim 7, wherein the UPnP device information further comprises at least one of a subelement identifier having a predetermined value which indicates the client supports an Organizational Unique Identifier (OUI) indicating a Car Connectivity Consortium (CCC) service, OUI Type indicating a supportable UPnP device type, MirrorLink server supportability, TmClientProfile supportability, TmNotification Server role executability, and a port number.

10. An apparatus for connection between a server and a client, the apparatus comprising:
    a transmitter of the client, performing a device discovery procedure with the server, and either receiving, from the server, Universal Plug and Play (UPnP) device information of the server or transmitting, to the server, UPnP device information of the client; and
    a processor of the client, allocating an Internet Protocol (IP) to the server, connecting with the server, and starting a UPnP operation based on the UPnP device information,
    wherein the UPnP device information includes type information indicating whether the client includes a UPnP-related module for supporting a mirrorlink,
    wherein the UPnP device information further comprises Uniform Resource Locator (URL) information generated by combining at least two of an Internet Protocol (IP) of the client, a port number obtained through the device discovery procedure, and a Device Description eXtensible Markup Language (XML), and wherein the URL information indicates a location of a device description of the client.

11. The apparatus of claim 10, wherein the transmitter requests UPnP Device Description information from the server.

12. The apparatus of claim 10, wherein the UPnP device information further comprises at least one of a subelement identifier having a predetermined value which indicates the client supports an Organizational Unique Identifier (OUI) indicating a Car Connectivity Consortium (CCC) service, OUI Type indicating a supportable UPnP device type, MirrorLink server supportability, TmClientProfile supportability, TmNotification Server role executability, and a port number.

* * * * *